United States Patent
Cook et al.

(10) Patent No.: US 12,072,190 B2
(45) Date of Patent: Aug. 27, 2024

(54) METHODS AND APPARATUS FOR CALIBRATING THE ZERO RATE OUTPUT OF A SENSOR

(71) Applicant: CEVA TECHNOLOGIES, INC., Mountain View, CA (US)

(72) Inventors: Bryan A. Cook, Silver Spring, MD (US); Yun Li, Mountain View, CA (US); Mark Turner, Mountain View, CA (US); Douglas Charles Carlson, Mountain View, CA (US)

(73) Assignee: CEVA TECHNOLOGIES, INC., Mountain View, CA (US)

( * ) Notice: Subject to any disclaimer, the term of this patent is extended or adjusted under 35 U.S.C. 154(b) by 0 days.

(21) Appl. No.: 17/277,011

(22) PCT Filed: Nov. 22, 2019

(86) PCT No.: PCT/US2019/062769
§ 371 (c)(1),
(2) Date: Mar. 17, 2021

(87) PCT Pub. No.: WO2020/087088
PCT Pub. Date: Apr. 30, 2020

(65) Prior Publication Data
US 2022/0026214 A1  Jan. 27, 2022

Related U.S. Application Data

(60) Provisional application No. 62/856,953, filed on Jun. 4, 2019, provisional application No. 62/779,336, filed
(Continued)

(51) Int. Cl.
*G01C 21/16* (2006.01)
*G01C 25/00* (2006.01)
(Continued)

(52) U.S. Cl.
CPC ............ *G01C 21/16* (2013.01); *G01C 25/00* (2013.01); *G01P 15/18* (2013.01); *G01P 21/00* (2013.01); *G06F 3/0346* (2013.01)

(58) Field of Classification Search
CPC ...... G01C 21/16; G01C 25/00; G01C 21/165; G01C 21/1656; G01C 21/183;
(Continued)

(56) References Cited

U.S. PATENT DOCUMENTS 5,950,036 A * 9/1999 Konishi ................. G06K 15/00
399/11
7,118,518 B1 10/2006 Teeter
(Continued)

FOREIGN PATENT DOCUMENTS

CN 105675015 A 6/2016
CN 107024673 B 5/2019
(Continued)

OTHER PUBLICATIONS

Altman et al., Standard deviations and standard errors, BMJ, 2005 (Year: 2005).*
(Continued)

*Primary Examiner* — Kyle R Quigley
(74) *Attorney, Agent, or Firm* — PATENT PORTFOLIO BUILDERS PLLC

(57) ABSTRACT

A method for calibrating zero rate offset (ZRO) of a first inertial sensor located on a device, the method includes determining a stability level of the device based on information associated with at least one non-inertial sensor located on the device; and performing a calibration of the ZRO of the first inertial sensor when the stability level is above a threshold.

22 Claims, 9 Drawing Sheets

Related U.S. Application Data on Dec. 13, 2018, provisional application No. 62/736,355, filed on Sep. 25, 2018.

(51) Int. Cl.
  *G01P 15/18* (2013.01)
  *G01P 21/00* (2006.01)
  *G06F 3/0346* (2013.01)

(58) Field of Classification Search
  CPC ....... G01C 25/005; G01P 15/18; G01P 21/00; G06F 3/0346
  See application file for complete search history.

(56) References Cited

U.S. PATENT DOCUMENTS

| | | | |
|---|---|---|---|
| 7,158,118 B2 | 1/2007 | Liberty | |
| 9,470,544 B2 | 10/2016 | Takahira et al. | |
| 10,324,108 B2* | 6/2019 | Bhandari | G01P 21/00 |
| 2007/0073502 A1* | 3/2007 | Umeda | G01P 21/00 |
| | | | 702/96 |
| 2008/0051981 A1* | 2/2008 | Naber | G01L 23/225 |
| | | | 701/111 |
| 2008/0236241 A1 | 10/2008 | Ino | |
| 2008/0249732 A1* | 10/2008 | Lee | G01C 25/005 |
| | | | 702/96 |
| 2011/0301900 A1* | 12/2011 | Patel | G01C 25/00 |
| | | | 702/104 |
| 2012/0125123 A1 | 5/2012 | Hays et al. | |
| 2013/0079948 A1 | 3/2013 | Hsu et al. | |
| 2014/0222361 A1* | 8/2014 | Sheng | G01P 21/02 |
| | | | 702/96 |
| 2014/0358378 A1* | 12/2014 | Howard | F16F 15/00 |
| | | | 701/45 |
| 2014/0373595 A1* | 12/2014 | Glueck | G01C 25/005 |
| | | | 73/1.38 |
| 2015/0019151 A1* | 1/2015 | Vaissiere | G01D 18/006 |
| | | | 702/85 |
| 2015/0025801 A1* | 1/2015 | Linton | G01C 19/04 |
| | | | 701/530 |
| 2015/0057959 A1 | 2/2015 | Ezekwe | |
| 2015/0111463 A1* | 4/2015 | Barse | A63H 11/06 |
| | | | 446/465 |
| 2017/0231446 A1* | 8/2017 | Watanabe | H04N 5/2257 |
| | | | 15/319 |
| 2017/0315554 A1* | 11/2017 | Lee | G05D 1/0265 |
| 2019/0293451 A1* | 9/2019 | Cook | G01C 25/00 |

FOREIGN PATENT DOCUMENTS

| | | |
|---|---|---|
| JP | 2008151746 A | 7/2008 |
| JP | 2014153215 A | 8/2014 |
| JP | 2017049115 A | 3/2017 |
| WO | 2018118574 A1 | 6/2018 |

OTHER PUBLICATIONS

International Search Report / Written Opinion dated May 27, 2020 in related/corresponding PCT Application No. PCT/US2019/062769.

Decision to Grant dated Oct. 10, 2023 in corresponding/related Japanese Application No. 2021-516904.

Office Action with Extended European Search Report dated Jul. 26, 2022 in corresponding/related European Application No. 19874875.8.

Office Action dated May 29, 2023 in corresponding/related Japanese Application No. 2021-516904.

Office Action dated Jul. 25, 2023 in corresponding/related European Application No. 19874875.8.

* cited by examiner

| State Transition | To Stationary_Without_VIBRATION | To Stationary_With_VIBRATION | To UNKNOWN | To IN_MOTION |
|---|---|---|---|---|
| From STATIONARY_WITHOUT_VIBRATION | Stability Detector On<br><br>[Learn noise]<br><br><if stable, update ZRO, ΔZRO, record time & temperature><br><br>(ChangeMotionRequest to NO_CONSTRAINT per Eq. (3)) | [Save new stationary noise threshold]<br><br>(MotionRequest= STAY_STATIONARY)<br><br>[Set noise threshold to vibration noise] | [Save new stationary noise threshold]<br><br>(MotionRequest= NO_CONSTRAINT)<br><br>[Set noise threshold to saved stationary] | [Save new stationary noise threshold]<br><br>Stop Stability Detector<br><br>(MotionRequest= No_CONSTRAINT) |
| From STATIONARY_WITH_VIBRATION | (MotionRequest= STAY_STATIONARY)<br><br>[Set noise threshold to saved stationary] | Stability Detector On<br><br><if stable, update ZRO, ΔZRO, record time & temperature><br><br>(ChangeMotionRequest to NO_CONSTRAINT according to Eq. (3)) | (MotionRequest= NO_CONSTRAINT)<br><br>[Set noise threshold to saved stationary] | Stop Stability Detector<br><br>(MotionRequest= No_CONSTRAINT) |

FIG. 2A

| State Transition | To Stationary_Without_VIBRATION | To Stationary_With_VIBRATION | To UNKNOWN | To IN_MOTION |
|---|---|---|---|---|
| From UNKNOWN | (MotionRequest=STAY_STATIONARY)<br><br>[Set noise threshold to saved stationary] | (MotionRequest=STAY_STATIONARY)<br><br>[Set noise threshold to vibration stationary] | Stability Detector On<br><br><if stable, update ZRO, ΔZRO, record time & temperature><br><br>(ChangeMotionRequest to NON_URGENT_STATIONARY or URGENT_STATIONARY according to Eq. (2)) | Stop Stability Detector |
| From IN_MOTION | (MotionRequest=STAY_STATIONARY)<br><br>Start Stability Detector<br><br>[Set noise threshold to saved stationary] | (MotionRequest=STAY_STATIONARY)<br><br>Start Stability Detector<br><br>[Set noise threshold to vibration stationary] | Start Stability Detector<br><br>[Set noise threshold to saved stationary] | Stability Detector Off<br><br>(ChangeMotionRequest to NON_URGENT_STATIONARY or URGENT_STATIONARY according to Eq. (2)) |

FIG. 2B

| State Transition of MotionIntent Flag | To Stationary_Without_VIBRATION | To Stationary_With_VIBRATION | To UNKNOWN | To IN_MOTION |
|---|---|---|---|---|
| From STATIONARY_WITHOUT_VIBRATION | Stable Detector On, [Update noise at stable] <If stable, update ZRO, ZRO_Std, record time & temperature> (ChangeMotionRequest to STAY_STATIONARY_OPTIONAL or NO_CONSTRAINT according to Eq. (5)) | [Save stationary noise] (MotionRequest= STAY_STATIONARY_REQUIRED) [Set noise to vibration noise] | [Save stationary noise] (MotionRequest= NO_CONSTRAINT if calibration completed or same state as prior to entering STATIONARY_WITHOUT_VIBRATION state if calibration not completed) [Set Noise to saved stationary] | [Save stationary noise] Stop Stable Detector (MotionRequest= NO_CONSTRAINT if calibration completed or same state as prior to entering STATIONARY_WITHOUT_VIBRATION state if calibration not completed) |
| From STATIONARY_WITH_VIBRATION | (MotionRequest= STAY_STATIONARY_REQUIRED) [Set noise to saved stationary] | Stable Detector On, [Track vibration noise] <If stable, update ZRO, ZRO_Std, record time & temperature> (ChangeMotionRequest to STAY_STATIONARY_OPTIONAL or NO_CONSTRAINT according to Eq. (5)) | (MotionRequest= NO_CONSTRAINT if calibration completed or same state as prior to entering STATIONARY_WITHOUT_VIBRATION state if calibration not completed) [Set Noise to saved stationary] | Stop Stable Detector (MotionRequest= NO_CONSTRAINT if calibration completed or same state as prior to entering STATIONARY_WITHOUT_VIBRATION state if calibration not completed) |

FIG. 3A

| State Transition of MotionIntent Flag | To Stationary_Without_VIBRATION | To Stationary_With_VIBRATION | To UNKNOWN | To IN_MOTION |
|---|---|---|---|---|
| From UNKNOWN | (MotionRequest= STAY_STATIONARY_REQUIRED)<br><br>[Set noise to saved stationary] | (MotionRequest= STAY_STATIONARY_REQUIRED)<br><br>[Set noise to vibration noise] | Stable Detector On<br><br><If stable, update ZRO, ZRO_Std, record time & temperature><br><br>(ChangeMotionRequest to NON_URGENT_STATIONARY or URGENT_STATIONARY according to Eq. (6), or TIMER_STATIONARY after count down) | Stop Stable Detector |
| From IN_MOTION | (MotionRequest= STAY_STATIONARY_REQUIRED)<br><br>Start Stability Detector<br><br>[Set noise to saved stationary] | (MotionRequest= STAY_STATIONARY_REQUIRED)<br><br>Start Stability Detector<br><br>[Set noise to vibration noise] | Start Stable Detector<br><br>[Set noise to saved stationary] | Stable Detector Off<br><br>(ChangeMotionRequest to NON_URGENT_STATIONARY or URGENT_STATIONARY according to Eq. (6), or TIMER_STATIONARY after count down) |

FIG. 3B

| Name | Stop for TIMER_STATIONARY | Stop for URGENT_STATIONARY | Stop for NON_URGENT_STATIONARY | Stay stopped on STAY_STATIONARY_OPTIONAL |
|---|---|---|---|---|
| High Performance | Yes | Yes | Yes | Yes |
| Frequent Short Stops | Yes | Yes | Yes | No |
| Low Duty Cycle | Yes | Yes | No | Yes |
| No Timer Stop | No | Yes | Yes | Yes |
| Rare Long Stops | No | Yes | No | Yes |
| Timer Stop Only | Yes | No | No | Yes |
| No Interactive ZRO | No | No | No | Yes or No |

FIG. 4

METHODS AND APPARATUS FOR CALIBRATING THE ZERO RATE OUTPUT OF A SENSOR

RELATED APPLICATIONS

The present application is a U.S. National Stage Application of PCT/US2019/062769 filed Nov. 22, 2019, which relates to, and claims priority from, U.S. Provisional Patent Application No. 62/736,355 filed Sep. 25, 2018, entitled "METHODS AND APPARATUS FOR CALIBRATING THE ZERO RATE OUTPUT OF A SENSOR", U.S. Provisional Patent Application No. 62/779,336, filed Dec. 13, 2018, entitled "METHODS AND APPARATUS FOR CALIBRATING THE ZERO RATE OUTPUT OF A SENSOR" and U.S. Provisional Patent Application No. 62/856,953, filed on Jun. 4, 2019, entitled "METHODS AND APPARATUS FOR CALIBRATING THE ZERO RATE OUTPUT OF A SENSOR", the disclosures of all three of which are incorporated here by reference.

BACKGROUND

It is becoming increasingly popular and widespread for electronic devices, especially mobile devices such as cellular telephones, digital cameras, GPS units, laptop and palmtop computers, automobiles, robotic vacuum cleaners, etc. to include so-called motion sensors, such as nine-axis sensors, to provide enhanced functionality. They are referred to as being nine-axis because they include one gyroscope, one accelerometer, and one magnetometer for each of three orthogonal directions, comprising a total of nine sensors. A chip or other electronic component having such motion sensors is commonly referred to as an IMU or Inertial Motion Unit. The 3-D gyroscopes measure angular velocities. The 3-D accelerometers measure linear acceleration. The magnetometer measures a local magnetic field vector (or a deviation thereof). In spite of their popularity, the foreseeable capabilities of these nine-axis sensors are not fully exploited due to, among other things, the difficulty of calibrating and removing undesirable effects from the sensors. For instance, gyroscope tend to be subject to the well-known phenomenon known as zero-rate offset (ZRO) in which their output is non-zero (indicating rotation) when the gyroscope, in fact, is not rotating. Magnetometers suffer from several different well-known noise factors, such as near field interference, soft iron effects, and hard iron effects.

Cellular telephones, virtual reality glasses and headsets, augmented reality glasses and headsets, television remote control units and other 3-D pointing devices, and other portable communications devices are now also commonly available with IMUs and are being used in 3D applications for many different uses, including, but not limited to gaming applications, virtual reality (VR) and augmented reality (AR) applications, and photographic and videographic applications. An example of a 3D pointing device can be found in U.S. Pat. No. 7,158,118 to Matthew G. Liberty (hereafter referred to as the '118 patent), the disclosure of which is incorporated here by reference.

The '118 patent describes 3D pointing devices which include, for example, one or two rotational sensors and an accelerometer. The rotational sensor(s) are used, as described in more detail below, to detect an angular rate at which the 3D pointing device is being rotated by a user. However, the output of the rotational sensor(s) does not perfectly represent the angular rate at which the 3D pointing device is being rotated due to, for example, the aforementioned "zero-rate offset" or ZRO in the sensor(s)' outputs. For example, when a 3D IMU is motionless, the rotational sensor(s) will typically have a non-zero output due to ZRO. If, for example, the IMU is incorporated into a 3D pointing device that is used as an input to a user interface, e.g., to move a cursor or to display a virtual reality scene, this will have the undesirable effect of causing the cursor to drift across the screen when the user intends for the cursor to remain stationary. As another example, ZRO might cause a VR scene to drift when it should remain stationary or may cause a robotic vacuum cleaner to travel in the wrong direction. Thus, estimating and removing ZRO from sensor output is highly desirable. Making this process more challenging is the fact that the bias is different from sensor to sensor and, even for individual sensors, and is time-varying, e.g., due to changes in temperature and/or aging.

Many ZRO algorithms do not directly solve for the temperature slope, but try to dynamically learn ZRO when the device is stable, i.e., stationary, and continually refine this estimate.

It is common to have factory calibration of a sensor that will calibrate over temperature. However, this type of ZRO compensation has disadvantages. For instance, it has a high cost of calibration, because the device must be measured at multiple temperatures. This requires more equipment and takes substantially more time than performing no calibration, or performing calibration at a single temperature. Also, the temperature performance could change when the device is mounted, or over time, so having a dynamic algorithm on the device can keep the temperature slope calibrated.

PCT Published Patent Application 2018/118574, which is incorporated herein by reference in its entirety, discloses a method and apparatus for performing ZRO compensation that directly solve for the temperature slope of ZRO.

SUMMARY

According to an embodiment, a method for calibrating zero rate offset (ZRO) of a first inertial sensor located on a device includes determining a stability level of the device based on information associated with at least one non-inertial sensor located on the device; and performing a calibration of the ZRO of the first inertial sensor when the stability level is above a threshold.

According to an embodiment, a method for operating a robotic device includes sending one of a plurality of motion control requests to a controller based on a current Zero Rate Offset (ZRO) error level associated with one or more inertial sensors located on the robotic device; and controlling movement of the robotic device based on the motion control request.

According to an embodiment, a method for calibrating zero rate offset (ZRO) of a first inertial sensor located on a device includes stopping the device for a first time period for a reason unrelated to ZRO calibration; accumulating ZRO calibration data during the first time period; moving the device after the first time period; stopping the device for a second time period for a reason unrelated to ZRO calibration; accumulating ZRO calibration data during the second time period; and performing ZRO calibration using the accumulated ZRO calibration data from the first and second time periods.

According to an embodiment, a device includes at least one non-inertial sensor; at least one inertial sensor; at least one motor; a controller for calibrating a zero rate offset (ZRO) of the inertial sensor located on the device by determining a stability level of the device based on information associated with the at least one non-inertial sensor; and by performing a calibration of the ZRO of one of the at least one inertial sensor when the stability level is above a threshold.

According to an embodiment, a robotic device includes at least one motor; and a controller configured to receive one of a plurality of motion control requests based on a current Zero Rate Offset (ZRO) error level associated with one or more inertial sensors located on the robotic device and to control movement of the robotic device based on the motion control request using the at least one motor.

According to an embodiment, a device includes at least one motor; and a controller configured to: stop the device for a first time period for a reason unrelated to Zero Rate Offset (ZRO) calibration; accumulate ZRO calibration data during the first time period; move the device after the first time period; stop the device for a second time period for a reason unrelated to ZRO calibration; accumulate ZRO calibration data during the second time period; and perform ZRO calibration using the accumulated ZRO calibration data from the first and second time periods.

BRIEF DESCRIPTION OF THE DRAWINGS

A more detailed understanding may be had from the detailed description below, given by way of example in conjunction with drawings appended hereto. Figures in description, are examples. As such, the Figures and the detailed description are not to be considered limiting, and other equally effective examples are possible and likely. Furthermore, like reference numerals in the figures indicate like elements, and wherein:

FIGS. 2A and 2B illustrate a state diagram for a processing system in accordance with an embodiment; and FIGS. 3A and 3B illustrate a state diagram for a processing system in accordance with another embodiment; and FIG. 4 is a table showing one exemplary embodiment of how a device may be programmed to respond to the various states of the MotionRequest flag.

DETAILED DESCRIPTION

Figure 1:
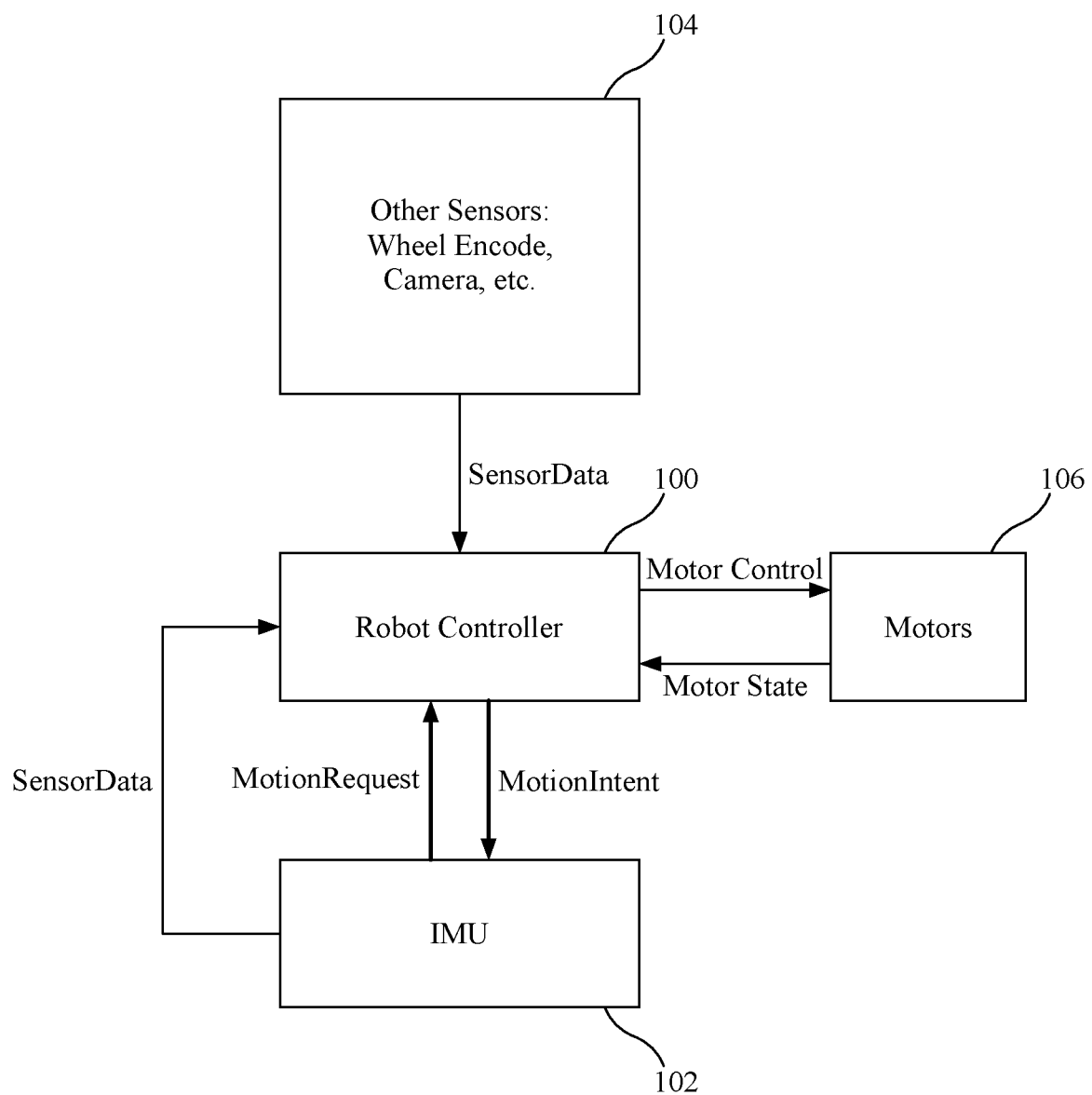
FIG. 1 is a block diagram showing components of an exemplary system in accordance with an embodiment.

The following detailed description of the invention refers to the accompanying drawings. The same reference numbers in different drawings identify the same or similar elements. Also, the following detailed description does not limit the invention. Instead, the scope of the invention is defined by the appended claims.

As noted above, an IMU may be used in robotics, such as a robot vacuum cleaner, which may have an IMU that include one or more accelerometers, magnetometers, and gyroscopes, to provide heading information for use in controlling the robot. The robot also may incorporate other sensors, such as a wheel encoder to measure the linear motion of the wheels, and/or a camera or LIDAR for navigation. The robot also may have a controller, such as a processor, that has access to the data from all the sensors, and therefore, can calculate the robot's motion, as well as positional, and/or orientational status. For example, if both the wheel encoder and the camera shows no motion, and all the motors are idle, the controller may reasonably assume that the robot is stationary.

In addition, the robot may include motors for causing the robot to move in any number of ways, including rotation about any axis and/or translation in any direction, including rotation and translation of parts of the robot relative to other parts of the robot (e.g., mechanical arms that move relative to the main body of the robot). The controller also may be adapted to direct the motion of the robot by controlling the motors.

In accordance with an embodiment, the controller (or other processing device) uses data from both the IMU sensors and the other sensors and components (e.g., cameras, wheel encoders) to improve the calibration of the IMU sensor(s).

As noted above, the proper bias calibration of a gyroscope (e.g., ZRO) is important to the performance of the IMU, and hence the heading of the robot. Generally, it is easiest to calibrate ZRO when the sensor is stationary. However, making this process more challenging is the fact that the bias differs from sensor to sensor and, even for an individual sensor, is time-varying, e.g., due to aging and changes in temperature.

Many ZRO algorithms try to dynamically learn ZRO when the device is stable, i.e., stationary, and continually refine this estimate. This works well if the device is stable frequently, but does not work if the device is in continuous motion for an extended period time after being stable. For example, a robotic vacuum cleaner may take a long time to clean a large room after the initial stable window, during which time the ZRO of a gyroscope may vary. One potential solution is to stop the robot periodically for ZRO calibration. However, ZRO recalibration is not necessarily required at fixed time intervals since ZRO change may depend on several factors. Stopping the robot when it is unnecessary is a waste of time. Thus, it would be beneficial for the controller to know when ZRO calibration is needed and when it is not needed.

Moreover, sometimes the robot is not absolutely stable, such that the inertial sensors indicate that it is not a good time to perform ZRO calibration, yet it still may be stable enough to permit reasonable ZRO calibration. For example, when a robotic vacuum cleaner is stationary, i.e. there is an absence of linear motion and angular motion, but the blower is operating, the inertial sensors are likely to detect a significant amount of measurement noise due to the vibration caused by the blower, such that a stable detection algorithm that is based on the inertial sensor outputs most likely would not decide that the robot is stable such that ZRO may be performed. However, in actuality, when the robot is not moving and not rotating, but is merely vibrating, a good ZRO calibration can be performed (although not as good as the stable and blower off case), especially with a relatively longer data collection window (e.g., a few seconds). Thus, it may be highly desirable to perform a ZRO calibration when the robot is not translating or rotating, but the blower is on, especially when a long time has passed since the last ZRO calibration.

Another special case is when the robot is rotating around the axis of gravity with a constant angular velocity (e.g., on a gimbal) and the IMU of the robot only has one or more gyroscopes and one or more accelerometers, but no magnetometers. As the gyroscope and accelerometer data is the same as when the robot is stationary, and there is no magnetometer to detect the heading variation, the stable detector will be "fooled" into thinking that the robot is stationary, and, hence, the rotating angular velocity would be taken as the ZRO. In this case, a flag from the robot indicating that the robot is in motion can avoid the false stable detection.

For the above-mentioned reasons, it would be beneficial to incorporate interactions between the robot controller and the ZRO (Zero Rate Offset) calibration unit/process in order to obtain an even more accurate estimation of whether the robot is stationary, and thus cause ZRO calibration to be performed only when desirable and to not be performed when not desirable or not necessary (or at least reduce the number of occasions where ZRO calibration is performed when it should not be performed or ZRO is not performed when it should be performed). More particularly, providing data from the robot controller to the ZRO calibration unit indicative of whether the device is stable, such as wheel encoder data and/or camera data, may make it possible to perform ZRO calibration in instances that might not have been deemed suitable in the past, thus allowing more frequent ZRO calibration, when needed or desirable. Complementarily, the ZRO calibration unit could communicate with the robot controller to request the that the robot be stopped when ZRO calibration becomes necessary, but cannot otherwise be performed because the robot is moving.

FIG. 1 is a block diagram of an exemplary robot system in accordance with an embodiment, e.g., a robotic vacuum cleaner. The system includes a robot controller, which may include a processor for processing data received from the IMU 102 and other sensors 104 on the robot, such as wheel encoders and a camera. The IMU 102 may include inertial sensors, such as one or more gyroscopes to detect rotation about one or more axes, accelerometers to detect acceleration along one or more directions, and one or more magnetometers to detect direction relative to the earth's magnetic field. The robot controller 100 may communicate with one or more motors 106 that can cause the robot and/or distinct parts thereof to move and perform functions, including translational motion and rotational motion. Both the robot controller 100 and the IMU 102 may include one or more processors and one or more memories (not shown separately). For instance, a processor within or otherwise associated with the IMU can interact with the inertial sensors to execute a bias offset compensation technique. Likewise, a processor within the robot controller may interact with and control other components of the system, such as the motors. The processor associated with the robot controller 100 and the processor associated with the IMU 102 may be comprised of a single processor adapted to perform both sets of functions. In fact, each component in FIG. 1 may comprise one or more software modules running on a processor, including a general-purpose computer, or may be composed of dedicated hardware components for performing the functions described hereinbelow, including, but not limited to, ASICs, state machines, logical circuits, analog circuits, digital circuits, processors, or may be a combination of any of the above-noted elements. The IMU may also perform the function of determining whether the device (e.g., the robot) is stationary/stable based on the data from the inertial sensors.

In accordance with an embodiment, in addition to the above-mentioned components, functions, and signals, the robot controller component 100 and the IMU component 102 may exchange MotionRequest flag signaling and MotionIntent flag signaling. Furthermore, the robot controller may further include a separate Stability Detection function.

As will be described in greater detail below, the Stability Detection function in the robot controller determines whether the robot is stable and/or how stable (or stationary) it is based on the data received from the other sensors (i.e., not the inertial sensors in the IMU).

As will also be described in greater detail below, the MotionIntent flag is a signal issued by the robot controller to the IMU that indicates a motion state of the robot. It is termed the MotionIntent flag because the data from the non-inertial sensors could conceivably cause the robot controller to incorrectly calculate the actual motion of the robot. For instance, the wheel encoder data may indicate that the wheels are not rolling, which might reasonably be used by the robot controller to conclude that the robot is stationary. However, if the robot is on a slippery surface, it is conceivable that the robot might actually be sliding along the floor. It also is possible that a camera output might not accurately reflect the motion status of the robot. The MotionRequest flag is a signal issued by the IMU to the robot controller that to indicate whether the IMU wants the robot to stop so that the IMU can perform a ZRO calibration.

I. STABILITY DETECTION FUNCTION WITH ADAPTIVE SENSOR NOISE LEVEL

Stability detection is desirable for ZRO calibration purposes. When the robot/sensors are stable, the average of the gyroscope output data over a time window essentially is an estimate of the ZRO. The accuracy of this estimate depends on the gyroscope noise level and the length of the time window over which the noise is observed. In other embodiments, the ZRO estimation may be much more complicated than simply taking the average of the gyroscope output data over a time window. For instance, previously mentioned PCT Published Patent Application 2018/118574 discloses a method and apparatus for performing ZRO compensation that directly solve for the temperature slope of ZRO to obtain an accurate ZRO estimation at the current temperature.

If the noise level of the sensors is known, a determination that the robot is stable (e.g., such that a bias estimation may be performed) may be based on whether (1) the peak-to-peak variation of the samples in a window is within a first threshold (hereinafter termed the sample threshold) and (2) the window mean does not change more than a second threshold (herein termed the mean threshold). When there are multiple sensors, (e.g. accelerometer, gyroscope, and magnetometer inside an IMU,) the stability detection should be based on the measurement data from all the sensors, e.g., the robot may be deemed to be stable only when all the sensors are stable.

The sample threshold and mean threshold are both calculated from the sensor noise level. However, the noise level is different from sensor to sensor within the same model. The nominal value for each sensor model noise (e.g., the value supplied by the manufacturer or by pre-operation testing or otherwise determined prior to the current time) may be used as the noise level. However, this value typically is not accurate for most sensors. If the actual noise level is larger than the nominal value, the sensor is very sensitive to motion, and thus it is difficult to accurately determine stability with such a sensor. On the other hand, if the actual noise level is much smaller than the nominal value, then it is not sensitive enough to motion, in which case the robot might be determined to be stable when it is, in fact, slowly moving, which would devastate the ZRO accuracy. Therefore, it is important to "learn" the actual noise level for each sensor.

In one embodiment as will be described in more detail below, the stability detection function may start by using the nominal value as the sensor noise level, and update the noise value for each sensor each time stability is detected. In this way, the sensor noise level that was used to calculate the sample threshold and the mean threshold continually becomes more accurate over time.

If there is vibration in addition to sensor noise, it becomes more complicated to determine if the device is stable. In the example of a robotic vacuum cleaner (RVC), for instance, this may occur when the RVC is not moving and not rotating, but at least one motor is on. As there might be different levels of vibration caused by different combinations of running motors or floor types, it may require an alternate solution to obtain a reasonably accurate detection of device stability. In one embodiment, a weighted statistic to dynamically learn the vibration noise may be employed, so that the stability detector can adapt to different levels of vibration after a certain time, and still be able to detect unintended abrupt motion.

II. EMBODIMENT 1

A. The MotionIntent Flag from the Robot Controller to the IMU

The MotionIntent flag is generated by the robot controller based on the output data from the non-inertial sensors or other mechanical components of the robot that can provide data as to the mobility state of the robot, such as cameras, wheel encoders, motor controls, etc. This flag is sent to the IMU, which will use this flag in its determination of whether the robot is stable or not and/or how stable it is. Merely as one example, if the motor controller determines from the wheel encoders that the wheels are not moving, the images detected by the camera are unchanging, the blower motor is off, and the wheel motors are off, it may generate a MotionIntent flag indicating that it believes the robot is stable. If, on the other hand, all of those conditions are the same, except that the blower motor is on rather than off (and possibly the images received by the camera are shaky), it may generate a Motion Intent flag indicating that it believes the robot is not translating and not rotating, but is not entirely motionless (e.g., it is vibrating).

In one embodiment, the MotionIntent flag may be a two bit flag with four states indicating one of the following states:

Unknown:

This state indicates that the robot controller does not believe it can provide an accurate estimation of the motion state of the robot. It is still possible that the robot is stable.

Stationary_without_Vibration:

This state of the MotionIntent flag indicates that the robot controller predicts that the robot is stationary without additional vibrations. This is when the robot is intended to be still, i.e., there is no linear motion, no rotation, and no vibrations. Hence, the noise of the gyroscope data should be just the sensor noise, and the ZRO estimation captured from the gyroscope output data should be accurate.

Stationary_with_Vibration:

This state of the MotionIntent flag indicates that the robot controller predicts that the robot is essentially stationary, but is vibrating. The robot may be in this state when the robot is intended to have no linear motion and rotation, but is vibrating (e.g., the vacuum blower is on in a robotic vacuum cleaner). In this state of motion, the noise in the gyroscope output data may be assumed by the IMU processor (e.g., the ZRO estimation function) to include both the sensor noise and the noise from vibration. The IMU may be able to calculate a reasonably accurate ZRO estimate using this data, but that estimate may require a longer time window for observation and/or may be less accurate than when the robot is fully stable.

In_Motion:

This state of the MotionIntent flag indicates that the robot controller predicts that the robot is in motion, and not expected to be stationary. When the MotionIntent flag is in this state, the IMU generally should not perform ZRO calibration at all.

As noted above, these flags are just the "intent" of the robot. Even when the flag indicates a stationary state, there might be "unintended" motion. For example, the robot might be suddenly struck by an object or the robot might be slipping on the floor (although the wheel encoders indicate that the robot is stationary). Therefore, in an embodiment, even when the MotionIntent flag indicates that the robot is stationary, a separate stability detector in the IMU (e.g., that uses the data from the inertial sensors) may still continue to operate and its motion prediction used to predict that the robot is moving despite the contrary conclusion from the robot controller, and prevent the IMU from attempting to estimate the ZRO under such conditions, which might cause a very wrong ZRO estimate to be generated.

B. The MotionRequest Flag from the IMU to the Robot Controller

The IMU may determine its ZRO status (e.g., the current ZRO estimate is likely accurate or the current ZRO estimate is likely not accurate) and send a MotionRequest flag to the robot controller in accordance with its ZRO status. For instance, when there is a need to recalibrate ZRO, the sensor can request the robot to stop, or to remain stopped if the robot is already stopped. The flag may be designed to different levels of urgency of the need to update the ZRO estimate.

In one embodiment, the ZRO quality may be mainly determined by the following aspects:
 a. the time lapse, $\Delta t$, since last ZRO calibration due to aging effect;
 b. the temperature change, $\Delta T$, since the last calibration;
 c. the calibration quality of the last calibration (this may be indicated by the standard deviation of the ZRO estimate, $\Delta ZRO$);

The maximum ZRO error may be estimated as:

$$\text{"ZRO\_Err"} = \Delta t \cdot \text{aging\_slope} + \Delta T \cdot \text{temperature\_slope} + \Delta ZRO \quad (1)$$

The goal is to minimize the total "ZRO_Err" and thereby maximize the robot heading accuracy for a given sensor.

In an embodiment, the MotionRequest flag may be two bits and may have four states as follows:

No_Constraint:

The MotionRequest flag may be issued in this state when the robot is stable, in which case it indicates that the IMU has obtained sufficient data during the current stationary period to generate an accurate ZRO estimate. Hence, the robot is free to move or stop as desired. This state also may be issued when the robot is in motion, but there is no need to stop for ZRO purposes.

Stay_Stationary:

The MotionRequest flag may be issued in this state when the robot is stopped, and indicates that the stable window for a good ZRO calibration is not satisfied yet, and there is a request to keep the robot stationary.

Non_Urgent_Stationary:

The MotionRequest flag may be issued in this state when the robot is in motion and the IMU thinks stopping sometime soon would be helpful to check on the ZRO. In short, it is a request for the robot controller to stop sometime soon, but it is not urgent. The robot controller should stop the motion of the robot responsive to receiving this flag, if it is convenient. The level of convenience may be judged as a function of any one or more of several factors, including, remaining battery power, knowledge of the likely time to the robot stopping regardless of the state of the MotionRequest flag synchronizing the next stop to correspond to a future event like encountering an obstacle, a criticality state assigned to the function currently being performed by the robot and/or to the level of harm that might occur if the robot heading is inaccurate, etc.

Urgent_Stationary:

The MotionRequest flag may be issued in this state when the robot is in motion and the IMU thinks ZRO needs to be calibrated as soon as possible. In short, it is important to stop as soon as possible to prevent the heading error from becoming worse than desired.

In one embodiment, there may be three different levels of threshold for "ZRO_Err", namely, ZRO_Lo, ZRO_Md and ZRO_Hi. These three levels may be used to set the Motion-Request flag according to the following equation:

If the MotionIntent flag from the robot controller is UNKNOWN or IN_MOTION, then:

$$MotionRequest \text{ flag} = \begin{cases} NO\_CONSTRAINT & \text{if } ZRO\_Err \leq ZRO\_Md \\ NON\_URGENT\_STATIONARY & \text{if } ZRO\_Md < ZRO\_Err < ZRO\_Hi \\ URGENT\_STATIONARY & \text{if } ZRO\_Err \geq ZRO\_Hi \end{cases} \quad (2)$$

If the MotionIntent flag is STATIONARY_WITHOUT_VIBRATION or STATIONARY_WITH_VIBRATION, then:

$$MotionRequest = \begin{cases} NO\_CONSTRAINT & \text{if } \Delta ZRO \leq ZRO\_Lo \\ STAY\_STATIONARY & \text{if } \Delta ZRO > ZRO\_Lo \end{cases} \quad (3)$$

C. The ZRO Calibration Process in the IMU

The MotionIntent flag may be used by the IMU as an indication of the motion state of the robot, and the IMU process for ZRO calibration may be different depending on the state of the MotionIntent flag.

For example, when in the STATIONARY_WITHOUT_VIBRATION state, the IMU runs the stability detection with adaptive noise level. This involves use of a stability detection algorithm which is looking at the amount of dynamic motion present in the gyroscope and accelerometer signals during a period of time. The "on table" stability detector has a fixed threshold to allow for some amount of sensor "noise" and vibration, while still being declared stationary. The noise level used in that process is either the nominal value of the sensor for the first time, or the stationary noise level saved during the most recent previous stationary state. If the stability detection process performed in the IMU does not disagree with the MotionIntent flag from the robot controller that the robot is stable, which is highly likely unless some unintended motion is occurring such as slipping or being struck, the IMU performs a process to recalibrate the ZRO, such as a simple window average algorithm or the more complex process disclosed in aforementioned PCT Published Patent Application 2018/118574. The IMU should also save, at the same time, the standard deviation of the ZRO, a time stamp, and the temperature at that time.

Initially, while calculating an updated ZRO, the IMU sets the MotionRequest flag to STAY_STATIONARY. Then, after the ZRO estimate reaches a certain accuracy, see, e.g., Eq. (3), or after a predetermined time window, the MotionRequest flag is changed to NO_CONSTRAINT.

When the MotionIntent flag changes state from STATIONARY_WITHOUT_VIBRATION to any other state, the IMU saves the stationary sensor noise level and will use that new stationary noise level value for future STATIONARY_WITHOUT_VIBRATION state to continue.

When the MotionIntent flag is in the STATIONARY_WITH_VIBRATION state, the IMU may run its stability detection process with a different noise level. Particularly, the noise level may be a fixed preset value, e.g., based on some typical vibration of the robot. It likely would be a larger value than for the STATIONARY_WITHOUT_VIBRATION state (generally resulting in a longer time window for determining ZRO). Although it is an option, it may not be particularly useful to learn the noise level with vibration, as in the STATIONARY_WITHOUT_VIBRATION case, because there might be different levels of vibration caused by different combinations of running motors or floor type. On the other hand, in other embodiments, it may be possible to learn and store a distinct noise level for each possible combination of states of the motors (and/or other factors). Then, during operation, the device may detect the states of the motors (and/or other factors) and select the one of those multiple noise levels corresponding to that particular combination of motor states (and/or other factors).

In an alternate embodiment, the robot controller may communicate these states of the motors for use in classifying the different noise levels. In another alternative embodiment, instead of learning and storing the distinct noise levels, the system may dynamically adapt to the current noise level. The adaptation rate may be tuned so that the noise level would grow fast enough that it would quickly adapt to a new vibration that was larger than previously, but change slow enough that it could reject unexpected motion events, such as being bumped.

To compute the ZRO during vibration, a running average of the samples during the stationary period may be taken as a reasonable estimate of ZRO. For shorter windows and with large vibrations, the fundamental frequency of the vibration may be determined and the length of the averaging window may be adapted to be a multiple of the fundamental frequency of the vibration. This may help prevent the ZRO estimate from being biased. The fundamental frequency can be detected by frequency domain analysis (e.g., a FFT-based analysis) or by time domain analysis (e.g., a zero-crossing analysis).

If the IMU stability detection process performed by the IMU does not disagree with the MotionIntent flag from the robot controller that the robot is stationary but vibrating/noisy, which is highly likely unless some unintended motion has occurred such as wheel slippage or being struck, the IMU recalibrates the ZRO. The IMU should also save at the same time the standard deviation of the ZRO, the time stamp, and the temperature.

Initially, while calculating an updated ZRO in this state, the IMU sets the MotionRequest flag to STAY_STATIONARY. Then, after the ZRO estimate reaches a certain accuracy, e.g., see Eq. (3), or after a predetermined time window, the MotionRequest flag is changed to NO_CONSTRAINT.

When the MotionIntent flag changes state from STATIONARY_WITH_VIBRATION to any other state, the IMU saves the time and temperature of the last ZRO estimate for later use.

When the MotionIntent flag is in the IN_MOTION state, the IMU will not perform stability detection in order to avoid a false stability detection and, thus, also avoid a potential recalibration of the ZRO that is likely to be inaccurate. Also, in this state (i.e., the MotionIntent flag is set to IN_MOTION), the IMU sets the MotionRequest flag to NO_CONSTRAINT, NON_URGENT_STATIONARY, or URGENT_STATIONARY depending on other factors. For instance, in one embodiment, the state of the MotionRequest flag is set according to Eq. (2). In another embodiment, the state of the MotionRequest flag is set simply as a function of time since the last ZRO calibration, e.g., switching from NO_CONSTRAINT to NON_URGENT_STATIONARY, and finally to URGENT_STATIONARY as time progresses.

Finally, when the MotionIntent flag is in the UNKNOWN state, the IMU will run its stability detection with stationary noise level. If the IMU's stability detection process determines that the robot is stable, which is possible, then the IMU will the IMU recalibrates the ZRO. The IMU may then set the MotionRequest flag the same as noted above for when the MotionIntent flag is in in the IN_MOTION state, e.g., NO_CONSTRAINT, NON_URGENT_STATIONARY, or URGENT_STATIONARY depending on other factors.

Furthermore, whenever the MotionIntent flag changes state, the noise threshold used by the IMU's stability detection algorithm also should be considered and potentially updated. For instance, whenever the MotionIntent flag changes state to STATIONARY_WITHOUT_VIBRATION, the noise threshold should be set to the saved stationary noise level (which may be the aforementioned nominal value or the latest updated value as previous discussed). This is also true for any transition into the UNKNOWN state from another state of the MotionIntent flag. On the other hand, any transition into the STATIONARY_WITH_VIBRATION state from any other state should be accompanied with setting the noise threshold used by the IMU stability detection process to the fixed "vibration" noise level, as previously mentioned. Finally, whenever the MotionIntent flag transitions to IN_MOTION, no action need be taken with regard to the setting of the noise level since the IMU's stability detection process is always turned off in this state.

FIGS. 2A and 2B illustrate a state table showing the functions performed by the IMU, as summarized above, for each given state of the MotionIntent flag as well as the functions performed when the MotionIntent flag changes from one state to another. More particularly, in FIGS. 2A and 2B, the current state of the MotionIntent flag is listed down the first (leftmost) column and the state to which it transitions at the end of that state is listed across the first (top) row. Accordingly, the cells along the diagonal of the table (the grey cells) involve no change of state of the MotionIntent flag. Thus, what is described in those cells are the functions performed when the MotionIntent flag is in the corresponding state. On the other hand, the other cells (not on the diagonal of the table) correspond to state changes of the MotionIntent flag. Accordingly, the text in those cells describes the tasks performed upon the transition between the two corresponding states.

Hence, for instance, the cell in the second row and second column reflects the process(es) performed when the MotionIntent flag is in the STATIONARY_WITHOUT_VIBRATION state. On the other hand, for instance, the cell in the second row and third column reflects the process(es) performed upon a transition of the MotionIntent flag from in the STATIONARY_WITHOUT_VIBRATION state to the STATIONARY_WITH_VIBRATION state. Likewise, the cell in the second row and fourth column reflects the process(es) performed when the MotionIntent flag transitions from the STATIONARY_WITHOUT_VIBRATION state to the UNKNOWN state.

Furthermore, the text in any cell that is printed without any brackets indicates what is being done by (or with respect to) the IMU's stability detection function. The text that is within arrow brackets indicates what variables are being updated and stored. Text that is printed within parentheses indicates the state to which the IMU is setting the MotionRequest flag. Finally, text that is printed within standard brackets indicates what is being performed with respect to the noise threshold variable. Note that, in at least some cells, two things are happening with respect to the noise level, e.g., (1) a noise level recorded at the end of the previous state may be getting saved for future use and (2) the noise level for use in the current state may be getting set.

III. EMBODIMENT 2

A. The MotionIntent Flag from the Robot Controller to the IMU

There are no significant changes with respect to the MotionIntent flag as compared to the first embodiment.

B. The MotionRequest Flag from the IMU to the Robot Controller

Two major factors in ZRO quality are temperature and time lapse since the last calibration. Time-related ZRO errors are caused by sensor instability, nonlinearity, hysteresis, aging, etc. Temperature-related ZRO errors are caused by ZRO variations due to temperature change. The temperature-ZRO fitting can be learned and applied to obtain the ZRO estimate at the current temperature, as disclosed in aforementioned PCT Published Patent Application 2018/118574. The temperature-ZRO fitting can also give the ZRO error based on the fitting status (e.g., the slope, the fitting quality, the temperature range covered, etc.).

Using these considerations, in an alternate embodiment of the MotionRequest Flag, the goal is to limit ZRO error to a first, lower (or acceptable) level of accuracy for the robot heading accuracy requirement, but to achieve a second, higher (or preferred) level of accuracy, when reasonably possible without adversely affecting other desired robot performance parameters. The two goals are also sometimes referred to below as LoPerfGoal and HiPerfGoal, respectively.

In this exemplary embodiment, when the robot is stationary (e.g., the MotionIntent flag state is either STATIONARY_WITHOUT_VIBRATION or STATIONARY_WITH_VIBRATION), the MotionRequest flag may have the following possible states:

Stay_Stationary_Required:
  The MotionRequest flag may be issued in this state when the stable window for ZRO calibration has NOT satisfied even the lower (acceptable) performance goal yet, in which state keeping the robot stationary is considered to be required.

Stay_Stationary_Optional:
  The MotionRequest flag may be issued in this state when the stable window for ZRO calibration has satisfied the low-performance goal, but not the high-performance (preferred) goal, in which state keeping the robot stationary is considered optional.

No_Constraint:
  The MotionRequest flag may be issued in this state when the IMU has sufficient information from the current stop to calculate a ZRO estimate satisfying the higher accuracy requirement, such that the robot is free to move or stop as desired without regard to ZRO estimation.

In an exemplary embodiment, for the ZRO calibration to reach a particular performance goal (e.g., either the lower, acceptable performance goal or the higher, preferred performance goal) means that the accuracy (or, specifically, standard deviation) of the ZRO estimate is better than a stated goal. Since the ZRO estimate is the gyroscope sample average over the stationary window, the longer the window, the more accurate the calculated ZRO estimate. The simplest model, the AWGN (Additive White Gaussian Noise) noise model, implies that the standard deviation of ZRO is proportional to the standard deviation of gyroscope samples and the square root of the number of samples:

$$ZRO\_Std = \frac{gyro\_Std}{\sqrt{N}} \quad (4)$$

However, it has been observed that ZRO_Std calculated by Eq. (4) can be very different from the true value, sometimes by an order of magnitude or so, due to colored noise.

In this embodiment, a new method to estimate ZRO_Std is used that does not require the saving of all the previous samples. Particularly, an IIR filter is used to mimic the averaging filter, and the standard deviation of the filtered samples is a used to estimate ZRO_Std. This provides better information about when the stationary window is long enough to meet a particular performance goal.

In one embodiment of the MotionRequest flag as mentioned above, there are two different levels of threshold for ZRO_Std: HiPerfGoal and LoPerfGoal. The states for the MotionRequest flag may be implemented as a function of the ZRO_Std as follows:

$$MotionRequest = \begin{cases} NO\_CONSTRAINT & ZRO\_Std \leq HiPerfGoal \\ STAY\_STATIONARY\_OPTIONAL & HiPerfGoal < ZRO\_Std < LoPerfGoal \\ STAY\_STATIONARY\_REQUIRED & ZRO\_Std \geq LoPerfGoal \end{cases} \quad (5)$$

On the other hand, when the robot is not stationary (e.g., the MotionIntent flag state is either UNKNOWN or IN_MOTION), the MotionRequest flag may have the following states:

Timer_Stationary:

The MotionRequest flag may be issued in this state when the robot has been moving for a certain amount of time, and stop for ZRO recalibration is suggested.

Urgent_Stationary:

The MotionRequest flag may be issued in this state when the IMU determines that the ZRO needs to be calibrated as soon as possible, such that it is important to stop to prevent the heading error from dropping below a desired threshold.

Non_Urgent_Stationary:

The MotionRequest flag may be issued in this state when the IMU determines that stopping sometime soon would be helpful to check on the ZRO. In short, it is a request for the robot controller to stop sometime soon, but it is not urgent. The robot controller should stop the motion of the robot responsive to receiving this flag, if it is convenient. The level of convenience may be judged as a function of any one or more of several factors, including, remaining battery power, knowledge of the likely time to the robot stopping regardless of the state of the MotionRequest flag synchronizing the next stop to correspond to a future event like encountering an obstacle, a criticality state assigned to the function currently being performed by the robot and/or to the level of harm that might occur if the robot heading is inaccurate, etc.

In one embodiment, there may be two different levels of threshold for "ZRO_Err", namely, NonUrgentErr and UrgentErr. These two levels may be used to set the MotionRequest flag according to the following equation:

$$MotionRequest = \begin{cases} NO\_CONSTRAINT & ZRO\_Err \leq NonUrgentErr \\ NON\_URGENT\_STATIONARY & NonUrgentErr < ZRO\_Err < UrgentErr \\ URGENT\_STATIONARY & ZRO\_Err \geq UrgentErr \end{cases} \quad (6)$$

C. The ZRO Calibration Process in the IMU

The MotionIntent flag may be used by the IMU as an indication of the motion state of the robot, and the IMU process for ZRO calibration may be different depending on the state of the MotionIntent flag.

For example, when in the STATIONARY_WITHOUT_VIBRATION state, the IMU runs the stability detection with adaptive noise level. The noise level used in that process is either the nominal value of the sensor for the first time, or the stationary noise level saved during the most recent previous stationary state. If the stability detection process performed in the IMU agrees with the MotionIntent flag from the robot controller that the robot is stable, which is highly likely unless some unintended motion is occurring such as slipping or being struck, the IMU performs a process to recalibrate the ZRO, such as a simple window average algorithm or the more complex process disclosed in aforementioned PCT Published Patent Application 2018/118574. The IMU should also save a time stamp and the temperature at that time for use in the temperature-ZRO fitting algorithm.

Also, the standard deviation of the ZRO is obtained through the statistics of the IIR low pass filtered gyroscope samples. This standard deviation is used to determine when the MotionRequest flag can be changed from the STAY_STATIONARY_REQUIRED state to the STAY_STATIONARY_OPTIONAL state and then to NO_CONSTRAINT according to Eq. (5).

In addition, whenever the MotionIntent flag changes from the STATIONARY_WITHOUT_VIBRATION state to any other state, the time of the last ZRO estimate is saved for later use in determining how long it has been since the last ZRO calibration, which, as mentioned above, may be used as a factor in deciding the state of the MotionRequest flag.

In addition, the stationary sensor noise level at that time is saved for future use when the MotionIntent flag is STATIONARY WITHOUT VIBRATION to automatically detect when the device is stationary independently of the MotionIntent flag.

Turning to the MotionIntent flag, in the STATIONARY_WITH_VIBRATION state, the stable detection, ZRO update, and MotionRequest generation may be the same as in STATIONARY_WITHOUT_VIBRATION state, except for how the noise level is tracked and used.

In the STATIONARY_WITHOUT_VIBRATION state, the noise level is just the sensor noise, and it is learned each time stability is detected, and is saved for future use. In the STATIONARY_WITH_VIBRATION state, the noise level is the vibration noise generated from motors, which can change from time to time. In one embodiment, a weighted statistic is used to dynamically learn the vibration noise, so that the stability detector can adapt to different levels of vibration after a certain time and still be able to detect unintended abrupt motion.

When the MotionIntent flag is in the IN_MOTION state, the stability detection process is turned off to avoid the possibility of a false stable detection. As previously noted, the MotionRequest flag states that may be generated when the MotionIntent flag is in the IN_MOTION state are NO_CONSTRAINT, NON_URGENT_STATIONARY, or URGENT_STATIONARY for temperature related requests. One way of selecting the state of the MotionRequest flag was set forth above in Eq. (6). There is also a counter to generate time-related request for the robot to stop moving, TIMER_STATIONARY.

When the MotionIntent flag is in the UNKNOWN state, the stability detection with stationary noise level process is run. If stability is detected, which is possible, the ZRO is updated. When the MotionIntent flag is in this state, the MotionRequest flag state is generated in the same way as when the MotionIntent flag is in the IN_MOTION state.

FIGS. 3A and 3B illustrate a state table showing the functions performed by the IMU, as discussed above, for each given state of the MotionIntent flag as well as the functions performed when the MotionIntent flag changes from one state to another in accordance with the second embodiment. The conventions described above for FIGS. 2A and 2B are also applicable to FIGS. 3A and 3B. More particularly, in FIGS. 3A and 3B, the current state of the MotionIntent flag is listed down the first (leftmost) column and the state to which it transitions at the end of that state is listed across the first (top) row. Accordingly, the cells along the diagonal of the table (the grey cells) involve no change of state of the MotionIntent flag. Thus, what is described in those cells are the functions performed when the MotionIntent flag is in the corresponding state. On the other hand, the other cells (not on the diagonal of the table) correspond to state changes of the MotionIntent flag. Accordingly, the text in those cells describe the tasks performed upon the transition between the two corresponding states.

Furthermore, the text in any cell that is printed without any brackets indicates what is being done by (or with respect to) the IMU's stability detection function. The text that is within arrow brackets indicates what variables are being updated and stored. Text that is printed within parentheses indicates the state to which the IMU is setting the MotionRequest flag. Finally, text that is printed within standard brackets indicates what is being performed with respect to the noise threshold variable. Note that, in at least some cells, two things are happening with respect to the noise level, e.g., (1) a noise level recorded at the end of the previous state may be getting saved for future use and (2) the noise level for use in the current state may be getting set.

In the embodiment illustrated in the table of FIGS. 3A and 3B, STAY_STATIONARY_REQUIRED is the default MotionRequest at entering to one of the stationary states from any other state (i.e., IN_MOTION state, UNKNOWN state or the other of the two stationary states). Also, note that, as the ZRO estimate calculation progresses (and improves in accuracy over time) while in one of the stationary states, the MotionRequest flag progresses from the STAY_STATIONARY_REQUIRED state to the STAY_STATIONARY_OPTIONAL state and then, eventually to the NO_CONSTRAINT state. However, in an alternate embodiment, when the MotionIntent flag transitions from one stationary state to another stationary state, the MotionRequest flag does not necessarily need to start from the STAY_STATIONARY_REQUIRED state. Rather, when changing from one stationary state to another, the MotionRequest flag may continue in whatever state it was already in. Particularly, the ZRO accuracy might already be above either accuracy threshold, HiPerfGoal or LoPerfGoal, at the time of the transition from one stationary MotionIntent state to the other stationary MotionIntent state, such that it is not necessary to go through all three MotionRequest states again.

In short, in an alternative embodiment, the MotionRequest flag may remain unchanged during any MotionIntent flag state transition between STATIONARY_WITH_VIBRATION and STATIONARY_WITHOUT_VIBRATION. Referring to FIG. 3, the difference between this embodiment and the one illustrated by FIG. 3 would be to eliminate the step of setting the MotionRequest flag to STAY_STATIONARY_REQUIRED in the cell at row 3, column 2 (transition from STATIONARY_WITHOUT_VIBRATION to STATIONARY_WITH_VIBRATION)) and the cell at row 2, column 3 (transition from STATIONARY_WITH_VIBRATION to STATIONARY_WITHOUT_VIBRATION). Since no action would be taken with regard to the MotionRequest flag (as it would remain unchanged during the transition between the two stationary states) the step "MotionRequest=STAY_STATIONARY_REQUIRED" in those two cells would simply be removed.

D. Use of MotionRequest on the Robot Side

Because the MotionRequest flag has different levels of importance, the robot can follow MotionRequests in multiple ways, depending, for instance, on the sensor properties, performance requirement, use cases, etc. For example, some sensors are known to have great stability and temperature-ZRO linearity, in which case the TIMER_STATIONARY state of the MotionRequest flag may be omitted (or, at least, ignored by the robot controller) because doing so would not sacrifice much performance.

FIG. 4 is a table showing one exemplary embodiment of how the robot may be programmed to respond to the various states of the MotionRequest flag depending upon the desired performance. In FIG. 4, a number of exemplary possible desired performance conditions for the robotic vacuum cleaner are listed down the first (leftmost) column and whether or not the RVC will stop (or remain stopped) in response to each given possible state of the MotionRequest flag is listed across the first (top) row. Then, the remainder of the table is populated with YES or NO depending on whether the RVC will stop motion (or remain stopped in the case of the last column) responsive to the MotionRequest flag state for the corresponding column.

Thus, for instance, the top row in the table, labelled High Performance, corresponds to the greatest ZRO accuracy performance, and, thus, would be selected when accurate ZRO estimation is extremely important. If this performance is desired, then the RVC will stop to permit ZRO calibration responsive to all requests for the RVC to stop (or, in the case of the last column, remain stopped so that ZRO calibration will continue until the higher, preferred level of ZRO accuracy is attained, rather than permitting the RVC to start moving again any time after merely the lower, acceptable level of ZRO accuracy has been achieved).

In an embodiment, the performance conditions (the entries in the leftmost column) may be defined as follows:

High Performance—selected when the best ZRO estimate is desired at all times regardless of how often the RVC must stop and how long it must remain stopped;

Frequency Short Stops—ZRO accuracy may be lower than in High Performance condition, but the stops generally will be relatively short (this option may be selected when frequent short stops are preferable, for instance);

Low Duty Cycle—ZRO accuracy may be lower than in the High Performance condition, but total time spent stopped for ZRO calibration is relatively smaller (in terms of a combination of duration of stops and frequency of stops);

No Timer Stop—RVC will not stop for the timer-based stationary requests (e.g., as noted above, this option may be selected when the sensors are known to have great stability and temperature-ZRO linearity);

Rare Long Stops—ZRO accuracy may be lower than in High Performance condition, but the stops generally will be sufficiently long so that the higher, preferred level of ZRO accuracy is attained, but relatively less frequent (this option may be selected when longer, but less frequent stops are preferable, for instance);

Timer Stop Only—RVC will stop only for timer-based stationary requests (this option may be selected when the sensors are known to have excellent temperature-ZRO linearity, for instance);

No Interactive ZRO—this option essentially turns off the interactive features of ZRO calibration disclosed in this specification. The baseline non-interactive ZRO calibration algorithm, i.e., stability detection followed by a simple window average or the more complex temperature-ZRO fitting, can still be used. Note that one way to achieve operation with no interactive ZRO calibration (but still having traditional ZRO calibration operation) would be to set the MotionIntent flag permanently to a default state of UNKNOWN and either disable the MotionRequest flag or prevent the motor controller 100 from responding to it. In this condition, in accordance with Embodiment 3 described above, for instance, the stability detection, the adaptive learning of the sensor noise level, and traditional ZRO calibration would all still occur and, in fact, would be the same as in the STATIONARY WITHOUT VIBRATION state (see FIG. 4, for instance). Furthermore, as a practicality for implementation purposes to assure compatibility between products employing the interactive ZRO calibration features of the present invention and products without such features, it may be advisable to assure that the stability detection and the noise tracking while the MotionIntent flag is in the UNKNOWN state be the same as when in the STATIONARY_WITHOUT_VIBRATION state. Referring to the embodiment represented by FIGS. 3A and 3B, for instance, this would entail adding the noise tracking step of "Update noise at stable" to the cell on the diagonal corresponding to the "from UNKNOWN" row and the "to UNKNOWN" column, i.e., row 4, column 4 (as found in the cell on the diagonal corresponding to the "from STATIONARY_WITHOUT_VIBRATION" row and the "to STATIONARY_WITHOUT_VIBRATION column, i.e., row 2, column 2). Particularly, in the FIGS. 3A and 3B embodiment, the noise was not being updated in the UNKNOWN motion state, whereas it was updated in the STATIONARY_WITHOUT_VIBRATION state. This change should have little or no effect on performance, but can make products with the interactive ZRO features of the present invention compatible with products that lack that feature. Note also that no change would be necessary to the stability detection operation shown in the FIGS. 3A and 3B embodiment since it was already set to the same state (namely, On) for both conditions of the MotionIntent flag (UNKNOWN and STATIONARY_WITHOUT_VIBRATION).

IV. ADDITIONAL EMBODIMENTS

A. Alternate Embodiments Relating to the MotionRequest Flag

1. Variations on Calculating the Standard Deviation of the ZRO

The MotionRequest flag for this first alternate embodiment may function similarly to either the first or the second embodiments except as stated below relating to calculating the standard deviation of the ZRO (which is used for purposes of determining whether the ZRO estimate is sufficiently accurate to stop the ZRO estimation process).

The first embodiment employed a white noise model technique to estimate the standard deviation of the ZRO. However, as previously noted, that estimate sometimes could be quite different from the true standard deviation due to colored noise. Thus, the second embodiment introduced an IIR filter-based technique for calculating the standard deviation of the ZRO that did not require storing all previous samples. However, for some cases where the sensors are subject to significant low frequency noise, that IIR filter-based technique may take a long time to converge to a solution. In such cases, and especially depending on applicable constraints on the time during which the robot may remain motionless, it may be more desirable to use the white noise method of the first embodiment, but compensate for the colored noise by multiplying the standard deviation determined using equation (4) above by a marginal factor (the marginal factor determined based on observational experience with the sensor). Thus, equation (4) may be rewritten as:

$$ZRO_{Std} = \left(\frac{gyro_{Std}}{\sqrt{N}}\right) * f \qquad (7)$$

where f is the marginal factor. Depending on the spectrum of the sensor noise, this marginal factor should be centered around 1, with the ideal case being 1.0 for true white noise. For currently available sensors, the marginal factor will typically be in the range of 0.4 to 1.5.

2. Variations Relating to Temperature Fit

In another alternate embodiment, when the MOTION_INTENT flag is in one of the non-stationary states (i.e., IN_MOTION or UNKNOWN), the IMU 102 may be configured to set the state of the MotionRequest flag based, not only on the current quality of the ZRO estimate, but also as a function of the estimated quality of the overall temperature fitting. For instance, the IMU 102 may be configured to place the MotionRequest flag in the URGENT_STATIONARY state and/or the NON-URGENT_STATIONARY state when the temperature fitting is below a certain quality threshold (such that more samples would be critical to maintaining the long term ZRO accuracy, even though the current ZRO quality itself may be acceptable). For example, in one exemplary embodiment of this feature, the minimum temperature change, dT, needed to trigger the MotionRequest flag to change to URGENT_STATIONARY and/or NON_URGENT_STATIONARY may be a function of the fitting quality (e.g., Mean Square Error or MSE) and the temperature range. That is, if the current temperature is outside of the temperature range of the fitting, stop the robot more often, and/or, if the fitting quality is bad, also stop more often.

In one exemplary variant of the second embodiment in accordance with these principles, when the robot is in one of the non-stationary states (i.e., when the MotionIntent flag is set to IN_MOTION or UNKNOWN), the MotionRequest flag may be configured to behave as follows:

Timer_Stationary

The MotionRequest flag may be issued in this state when the robot has been moving for a period of time and stop for ZRO recalibration is suggested. (Note that this conditions for the MotionRequest flag to enter this condition is unchanged from the second embodiment.)

Urgent_Stationary

The MotionRequest flag may be issued in this state when either (1) the IMU determines that the ZRO needs to be calibrated as soon as possible (e.g., it is important to stop the robot in order to prevent the heading error from falling below a critical threshold)(the same as in the second embodiment) or (2) when the temperature fitting is of a poor quality and more samples are critical for the long term ZRO accuracy, although the quality of the current ZRO estimate being used for the current temperature may be acceptable.

Non_Urgent_Stationary

The MotionRequest flag may be issued in this state when either (1) the IMU determines that stopping sometime soon would be helpful to check on the ZRO (as in the second embodiment) or (2) when the temperature fitting prefers more samples for better long term ZRO accuracy (but it is not critical).

No_Constraint:

The MotionRequest flag may be issued in this state when there is no need to stop for ZRO calibration or temperature fitting purpose.

Furthermore, in this embodiment, in addition to the two different levels of threshold for "ZRO_Err, namely, NonUrgentErr and UrgentErr, and setting of the MotionRequest flag state in accordance with equation (6) as discussed above in connection with the second embodiment, another set of conditions associated with temperature fitting may be added into the mix. For instance, for the temperature fitting-based request, let us define $\Delta T = T_{current} - T_{lastZRO}$ as the temperature changes from the last time ZRO was calculated, and two thresholds, $Th_{nonUrgent}$ and $Th_{urgent}$, as decreasing functions of the temperature fitting MSE (Mean Square Error):

$$Th_{nonUrgent} = f_1(MSE),$$

$$Th_{urgent} = f_2(MSE).$$

Then, the state of the MotionRequest flag as a function of fitting-based request can be generated as:

$$MotionRequest_{FIT} = \begin{cases} NO\_CONSTRAINT & \Delta T \leq Th_{nonUrgent} \\ NON\_URGENT\_STATIONARY & Th_{nonUrgent} < \Delta T < Th_{urgent} \\ URGENT\_STATIONARY & \Delta T \geq Th_{urgent} \end{cases} \quad (8)$$

Combining (a) the conditions of the ZRO-based control of the MotionRequest flag, i.e., equation (6) (reproduced again below for ease of reference) with (b) the conditions of the temperature fitting-based control of the MotionRequest flag, i.e., equation (8), yields an overall behavior of the MotionRequest flag as shown below in equation (9).

$$MotionRequest = \begin{cases} NO\_CONSTRAINT & ZRO\_Err \leq NonUrgentErr \\ NON\_URGENT\_STATIONARY & NonUrgentErr < ZRO\_Err < UrgentErr \\ URGENT\_STATIONARY & ZRO\_Err \geq UrgentErr \end{cases} \quad (6)$$

$$MotionRequest = \begin{cases} NO\_CONSTRAINT & \text{if both} = NO\_CONSTRAINT \\ URGENT\_STATIONARY & \text{if either} = URGENT\_STATIONARY \\ NON\_URGENT\_STATIONARY & \text{all other cases} \end{cases} \quad (9)$$

B. ZRO Temperature Fitting

PCT Published Patent Application WO 2018/118574, the contents of which are incorporated herein fully be reference, discloses methods and apparatus for calculating the ZRO of a sensor as a function of temperature using a learning algorithm.

For example, in accordance with one embodiment disclosed in that patent application, the system iteratively receives (a) a measurement generated by the gyroscope, (b) a temperature of the gyroscope, and (c) a measurement generated by at least one other motion sensor of the device, and determines, based on the measurements generated by the gyroscope and the other sensor, when the gyroscope is both stationary and at a particular temperature. During such periods, the system accumulates a mean and a variance of the mean of the gyroscope measurements to generate a sample data set and then generates a weighted Recursive Least Squares (RLS) fit of ZRO as a function of temperature based on the mean and variance of the mean of the gyroscope measurements at a plurality of temperatures. Then, the device can compute a ZRO estimate using the weighted RLS fit and the current temperature of the gyroscope.

In accordance with certain embodiments, a temporal forgetting factor is applied to all the samples already inside the fit so that older samples are given less weight in building the fit than newer samples (as factors relevant to ZRO can change over time). However, for certain applications, e.g., a robotic vacuum cleaner that spends much of its time charging on a docking station overnight while the room temperature fluctuates within a very small temperature range, this may cause data points to be forgotten too fast to the detriment of the accuracy of the fit. For instance, a very accurate ZRO fitting for a very narrow temperature range while data points outside of that narrow temperature range are being forgotten, thus making the ZRO estimate outside of that narrow temperature range less accurate.

In order to prevent such operation with a forgetting factor from detrimentally affecting the fit, it may be advisable to keep track of the temperature range over which consecutive samples are taken and limit the weight afforded to the added samples within that temperature range. For instance, the algorithm may simply stop taking in sample data (within the give narrow temperature range) after a certain number of samples are applied to the fitting. In such case, only when the temperature changes beyond the given range, are new samples allowed to be added (and a new temperature range may begin being tracked accordingly).

In one such embodiment, the ZRO temperature fitting process may keep track of the current temperature statistics, previous temperature statistics, and the linear ZRO-temperature fitting (as in the aforementioned PCT application), as well as the latest ZRO estimate from an interactive ZRO calibration technique described herein. As the ZRO estimate from the most recent interactive ZRO calibration is the most recent data, it may be desirable to give it a high priority when a ZRO is being selected for use from the fit.

Hence, when an interactive ZRO calibration techniques of the present invention is employed in a device as well as the techniques of the aforementioned PCT patent application, then, the most recent ZRO calibrated via the interactive ZRO calibration technique of the present invention may be given higher priority when selecting which ZRO estimate to use for compensation. Thus, in an embodiment, assuming that the most recent ZRO determined using an interactive ZRO calibration technique in accordance with the present invention is deemed valid (e.g., the standard deviation of the most recent ZRO accumulation is within a predetermined threshold, such as described above in any of sections II.B, III.B, and IV.A), the overall ZRO compensation process selects for use the better of that ZRO and the ZRO dictated by the fitting algorithm of the aforementioned PCT patent application. Which of the two that is deemed better may be determined, for instance, based on lowest mean square error. On the other hand, if the ZRO determined using the interactive ZRO calibration technique is not reasonable, the overall ZRO compensation process defaults back to selecting the best one of the current temperature, previous temperature, and the linear fitting, as set forth in the aforementioned PCT patent application.

C. Special Processing for Applications Prone to Frequent Short Stops

In some applications, the robot may experience frequent short stops for operational reasons (i.e., reasons unrelated to the ZRO calibration and the interactive ZRO technique of the present invention) wherein few or none of the stops are long enough for sufficiently accurate ZRO calibration to occur. In order to avoid stopping the robot for frequent and/or long ZRO calibration stops (which may be counterproductive to its normal operation), proper ZRO calibration may still be attainable with fewer stops made solely for ZRO calibration purposes by "stitching" together the calibration data from multiple consecutive short stops to effectively form a long stop. For instance, if the gap between two stationary windows is less than some predetermined threshold (e.g., 10 seconds), the ZRO calibration data from those multiple stops may be combined. This may be implemented by maintaining an internal accumulator of calibration data from multiple stops of the robot and starting a timer every time motion starts. If the next stop occurs before the timer expires, the accumulator continues accumulating data for ZRO calibration, and the timer is reset again. In certain embodiments, a second timer and/or time limit may be employed to set a maximum time over which any set of multiple consecutive short stops can be combined. Alternately, a single timer may be used to monitor only an overall time period over which the data from multiple stop sessions may be combined (e.g., without regard to the duration of the gaps between each pair of consecutive stop sessions).

Figure 5:
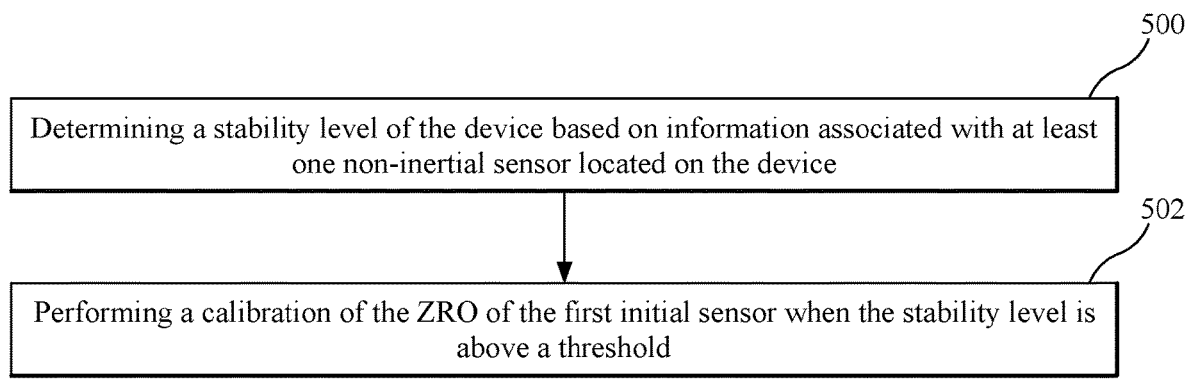
FIGS. 5-7 are flowcharts illustrating methods according to embodiments.
Figure 6:
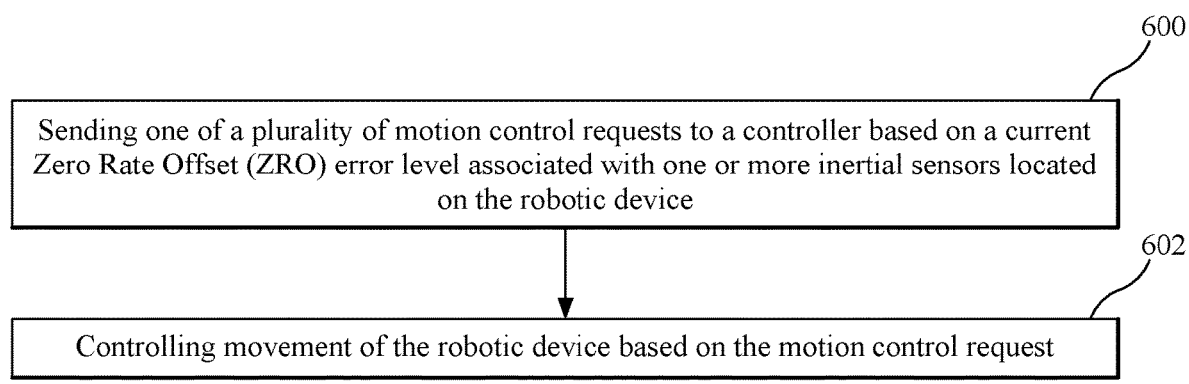
Figure 7:
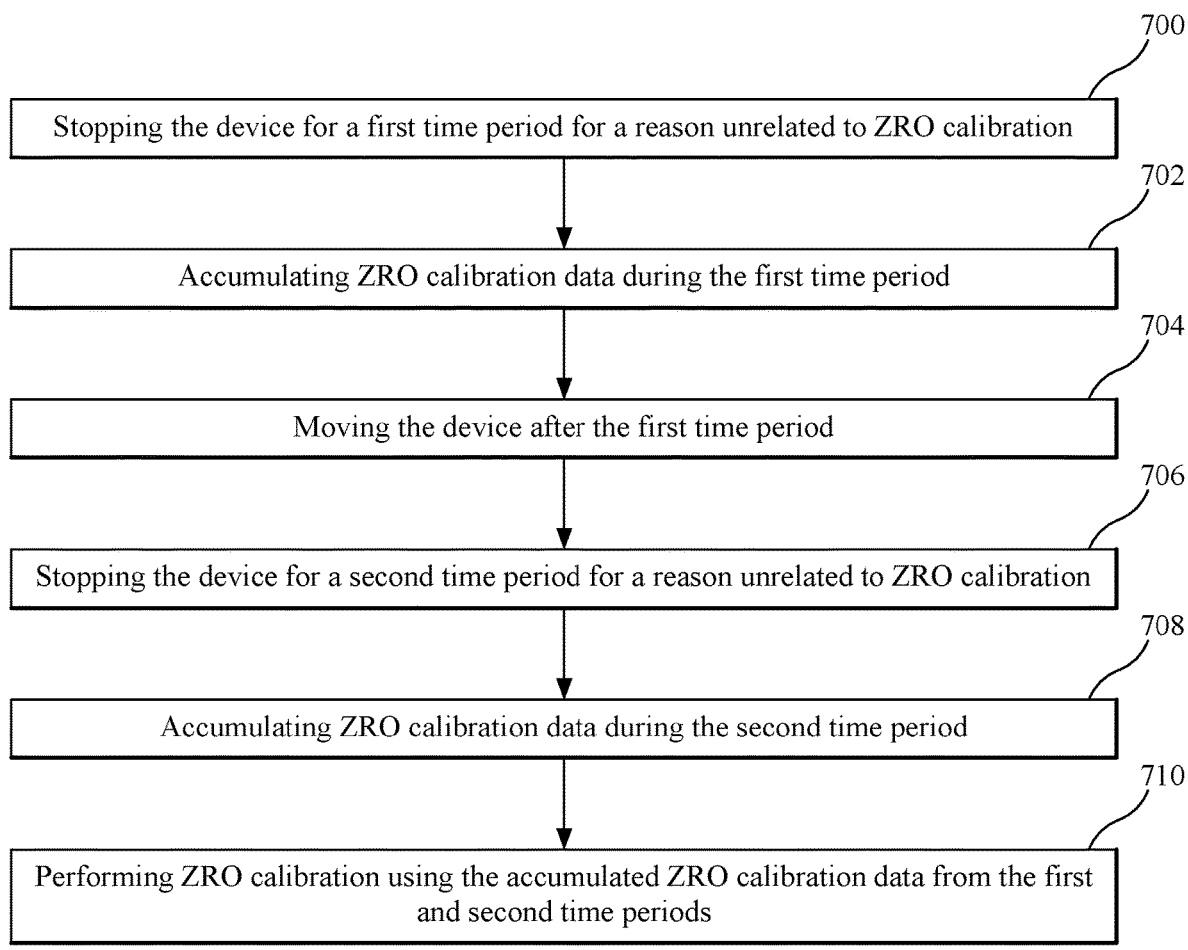

It will be appreciated by those skilled in the art that embodiments described herein can also be expressed as methods, examples of which are illustrated in the flow charts of FIGS. 5-7. In FIG. 5, a method for calibrating zero rate offset (ZRO) of a first inertial sensor located on a device is illustrated and includes the step 500 of determining a stability level of the device based on information associated with at least one non-inertial sensor located on the device and the step 502 of performing a calibration of the ZRO of the first initial sensor when the stability level is above a threshold. In FIG. 6, method for operating a robotic device is illustrated and includes the step 600 of sending one of a plurality of motion control requests to a controller based on a current Zero Rate Offset (ZRO) error level associated with one or more inertial sensors located on the robotic device and the step 602 of controlling movement of the robotic device based on the motion control request. In FIG. 7, a method for calibrating zero rate offset (ZRO) of a first inertial sensor located on a device is illustrated and includes the step 700 of stopping the device for a first time period for a reason unrelated to ZRO calibration, the step 702 of accumulating ZRO calibration data during the first time period, the step 704 of moving the device after the first time period, the step 706 of stopping the device for a second time period for a reason unrelated to ZRO calibration, the step 708 of accumulating ZRO calibration data during the second time period, and the step 710 of performing ZRO calibration using the accumulated ZRO calibration data from the first and second time periods.

V. SUMMARY

The implementation of the MotionIntent flag sent from the robot controller to the IMU helps improve the ZRO accuracy. The MotionRequest flag sent from the IMU to the robot controller helps guarantee that the worst ZRO always satisfies the heading performance requirement. Overall the interactive ZRO algorithm improves the ZRO accuracy, and satisfies the requirement with minimum request for robot stop.

VI. CONCLUSION

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., a robot or other device, which contains the sensors or the software may run on a processor or computer housed within another device, e.g., a system controller, a game console, a personal computer, etc., which is in communication with the device containing the sensors. In such a case, data may be transferred via wireline or wirelessly between the device containing the sensors and the device containing the processor which runs the software which performs the bias estimation and compensation as described above. According to other exemplary embodiments, some of the processing described above with respect to bias estimation may be performed in the device containing the sensors, while the remainder of the processing is performed in a second device after receipt of the partially processed data from the device containing the sensors.

Although the foregoing exemplary embodiments relate to sensing packages including one or more rotational sensors and an accelerometer, bias estimation techniques according to these exemplary embodiments are not limited to only these types of sensors. Instead bias estimation techniques as described herein can be applied to devices which include, for example, only accelerometer(s), optical and inertial sensors (e.g., a rotational sensor, a gyroscope or an accelerometer), a magnetometer and an inertial sensor (e.g., a rotational sensor, a gyroscope or an accelerometer), a magnetometer and an optical sensor (e.g., a camera, one or more photodiodes, one or more phototransistors), or other sensor combinations. Additionally, although exemplary embodiments described herein relate to bias estimation in the context of robots and robotic vacuum cleaners and applications, such techniques are not so limited and may be employed in methods and devices associated with other applications, e.g., mobile phones, medical applications, gaming, cameras, military applications, robotic devices, etc.

The above-described exemplary embodiments are intended to be illustrative in all respects, rather than restrictive, of the present invention. Thus, the present invention is capable of many variations in detailed implementation that can be derived from the description contained herein by a person skilled in the art. For example, although the foregoing exemplary embodiments describe, among other things, the use of inertial sensors to detect movement of a device, other types of sensors (e.g., ultrasound, magnetic or optical) can be used instead of, or in addition to, inertial sensors in conjunction with the afore-described signal processing. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed:

1. A method for calibrating zero rate offset (ZRO) of a first inertial sensor located on a device, the method comprising:
   determining a stability level of the device based on information associated with at least one non-inertial sensor located on the device which is used to generate a state of motion signal sent from a controller on the device to an inertial motion unit (IMU);
   determining a temperature of the first inertial sensor;
   collecting multiple samples of an output of the first inertial sensor during periods when an overall stability status indicates that the device is sufficiently stable for ZRO calibration and the temperature of the first inertial sensor is stable;
   estimating the ZRO of the first inertial sensor at the temperature of the first inertial sensor during the collecting as a function of the samples;
   determining at least two consecutive discrete periods during which the device is stable and the temperature of the first inertial sensor is stable and substantially the same stable over the at least two consecutive periods;
   determining a gap time between the at least two consecutive discrete periods; and
   performing a calibration of the ZRO of the first inertial sensor when the stability level is above a first threshold, wherein the performing the calibration of the ZRO of the first inertial sensor comprises, if the gap time is below a second threshold, combining the samples from the at least two consecutive discrete periods to generate a ZRO estimate.

2. The method of claim 1, further comprising:
   receiving data from the at least one non-inertial sensor indicative of a stability of the device;
   estimating, based on the data from the at least one non-inertial sensor, a first stability status of the device;
   receiving data from at least one inertial sensor indicative of the stability of the device, wherein the at least one inertial sensor may include the first inertial sensor;
   estimating, based on the data from the at least one inertial sensor, a second stability status of the device;
   determining the overall stability status of the device based on a combination of the first stability status and the second stability status; and
   performing the calibration of the ZRO of the first inertial sensor if the overall stability status indicates that the device is sufficiently stable for ZRO calibration.

3. The method of claim 1 further comprising:
   estimating a quality of a current ZRO value for the first inertial sensor;
   determining a level of necessity of performing ZRO calibration based on the estimation of the quality of the current ZRO value for the first inertial sensor; and
   controlling the motion of the device as a function of the level of necessity of performing ZRO calibration.

4. The method of claim 3 wherein the determining the level of necessity of performing ZRO calibration comprises generating a first flag indicative of the level, wherein the flag is in one of the following states:
   a no-constraint state indicating that there is no current need to calibrate ZRO;
   a stay-stationary state indicating that the overall stability status of the device indicates that the device should remain stationary;
   a non-urgent-request-for-the-device-to-become-stationary state indicating that the device should become stationary if convenient to do so; and
   an urgent-request-for-the-device-to-become-stationary state indicating that the device should become stationary if possible.

5. The method of claim 4 wherein (1) the first flag is generated in the stay-stationary state when a ZRO calibration is being performed, (2) the first flag is generated in the non-urgent-request-to-become-stationary state when the current ZRO value is determined to be within a first accuracy range; (3) the first flag is generated in the urgent-request-to-become-stationary state the current ZRO value is determined to be within a second accuracy range; and (4) the first flag is generated in the no-constraint state when the current ZRO value is determined to be within a third accuracy range.

6. The method of claim 2 wherein the first stability status may have one of the following values:
   a stable-without-vibration status indicating that the device is sufficiently stationary to perform a first type of ZRO calibration;
   a stable-with-vibration status indicating that the device is sufficiently stable to perform a second type of ZRO calibration;
   an unknown status indicating that the level of stability of the device is not known; and
   an in-motion status indicating that the device is insufficiently stable to perform a ZRO calibration.

7. The method of claim 2 wherein the first stability status includes multiple stability statuses indicative that ZRO calibration may be performed.

8. The method of claim 3 wherein the quality of the current ZRO value is based on at least one of the following:
   a time lapse since ZRO calibration has been performed;
   a temperature change since ZRO has been performed; and
   a calibration quality of a last ZRO calibration.

9. The method of claim 3 wherein estimating the quality of the current ZRO value for the first inertial sensor comprises determining a standard deviation associated with the ZRO value.

10. The method of claim 9 wherein determining the standard deviation associated with the ZRO value comprises:
    determining the standard deviation of output samples of the first inertial sensor used in generating the ZRO value;
    dividing the standard deviation of output samples of the first inertial sensor used in generating the ZRO value by the square root of the number of the output samples of the first inertial sensor used in generating the ZRO value; and
    multiplying the result by a marginal factor, the marginal factor determined based on observational experience with the first inertial sensor.

11. The method of claim 9 wherein determining the standard deviation associated with the ZRO value comprises:
    filtering output samples of the first inertial sensor used in generating the ZRO value with infinite impulse response (IIR) filter; and
    determining a standard deviation of the filtered samples.

12. The method of claim 3 further comprising:
    maintaining a fit of ZRO values as a function of temperature;
    estimating a quality of the fit;
    determining the level of necessity of performing ZRO calibration based on the estimation of the quality of the fit; and
    controlling the motion of the device as a function of the level of necessity of performing ZRO calibration based on the estimated quality of the fit.

13. The method of claim 1, wherein the step of determining further comprises:
    determining, by the controller on the device, the stability level based on at least one of (a) from wheel encoders that wheels attached to the device are not moving, (b) that images detected by a camera are unchanging, (c) that a blower motor is off, or (d) that wheel motors are off to generate the state of motion signal.

14. The method of claim 13, wherein the step of determining the stability level is based on all of (a)-(d).

15. A device comprising:
    at least one non-inertial sensor;
    at least one inertial sensor;
    at least one motor;
    a controller for calibrating a zero rate offset (ZRO) of the at least one inertial sensor located on the device by determining a stability level of the device based on information associated with the at least one non-inertial sensor, wherein the controller is configured to:
    determine a temperature of the at least one inertial sensor;
    collect multiple samples of an output of the at least one inertial sensor during periods when an overall stability status indicates that the device is sufficiently stable for ZRO calibration and the temperature of the at least one inertial sensor is stable;
    estimate the ZRO of the at least one inertial sensor at the temperature of the at least one inertial sensor during the collecting as a function of the samples;
    determine at least two consecutive discrete periods during which the device is stable and the temperature of the at least one inertial sensor is stable and substantially the same stable over the at least two consecutive periods;
    determine a gap time between the at least two consecutive discrete periods; and
    perform a calibration of the ZRO of one of the at least one inertial sensor when the stability level is above a first threshold by generating a state of motion signal sent from the controller to an inertial motion unit (IMU), wherein the performing the calibration of the ZRO of the at least one inertial sensor comprises, if the gap time is below a second threshold, combining the samples from the at least two consecutive discrete periods to generate a ZRO estimate.

16. The device of claim 15, wherein the controller is further configured to receive data from the at least one non-inertial sensor indicative of a stability of the device; estimate, based on the data from the at least one non-inertial sensor, a first stability status of the device; receive data from the at least one inertial sensor indicative of the stability of the device, estimate, based on the data from the at least one inertial sensor, a second stability status of the device; determine the overall stability status of the device based on a combination of the first stability status and the second stability status, the overall stability status including at least a first state indicating that the device is stable enough to perform ZRO calibration and a second state indicating that the device is not sufficiently stable to perform ZRO calibration; and perform the calibration of the ZRO of the one of the at least one inertial sensor if the overall stability status indicates that the device is sufficiently stable for ZRO calibration.

17. The device of claim 16 wherein the controller is further configured to:
    estimate a quality of a current ZRO value for the one of the at least one inertial sensor;
    determine a level of necessity of performing ZRO calibration based on the estimation of the quality of the current ZRO value for the one of the at least one inertial sensor; and
    control the motion of the device as a function of the level of necessity of performing ZRO calibration.

18. The device of claim 17 wherein the determining the level of necessity of performing ZRO calibration comprises generating a first flag indicative of the level, wherein the flag is in one of the following states:
    a no-constraint state indicating that there is no current need to calibrate ZRO;
    a stay-stationary state indicating that the overall stability status of the device indicates that the device should remain stationary;
    a non-urgent-request-for-the-device-to-become-stationary state indicating that the device should stay stationary if convenient to do so; and
    an urgent-request-for-the device-to-become-stationary state indicating that the device should stay stationary if possible.

19. The device of claim 18 wherein (1) the first flag is generated in the stay-stationary state when a ZRO calibration is being performed, (2) the first flag is generated in the non-urgent-request-to-stay-stationary state when the current ZRO value is determined to be within a first accuracy range; (3) the first flag is generated in the urgent-request-to-stay-stationary when the current ZRO value is determined to be within a second accuracy range; and (4) the first flag is generated in the no-constraint state when the current ZRO value is determined to be within a third accuracy range.

20. The device of claim 15, wherein the controller determines the stability level by:
   determining, by the controller, the stability level based on at least one of (a) from wheel encoders that wheels attached to the device are not moving, (b) that images detected by a camera are unchanging, (c) that a blower motor is off, or (d) that wheel motors are off to generate the state of motion signal.

21. The method of claim 20, wherein the step of determining the stability level is based on all of (a)-(d).

22. A method for calibrating zero rate offset (ZRO) of a first inertial sensor located on a device, the method comprising:
   determining a stability level of the device based on information associated with at least one non-inertial sensor located on the device which is used to generate a state of motion signal sent from a controller on the device to an inertial motion unit (IMU);
   determining a temperature of the first inertial sensor;
   collecting multiple samples of an output of the first inertial sensor during periods when an overall stability status indicates that the device is sufficiently stable for ZRO calibration and the temperature of the first inertial sensor is stable;
   estimating the ZRO of the first inertial sensor at the temperature of the first inertial sensor during the collecting as a function of the samples;
   determining at least two consecutive discrete periods during which the device is stable and the temperature of the first inertial sensor is stable and substantially the same stable over the at least two consecutive periods;
   determining a gap time between the at least two consecutive discrete periods; and
   performing a calibration of the ZRO of the first inertial sensor when the stability level is above a first threshold, wherein the performing the calibration of the ZRO of the first inertial sensor comprises, if the gap time is below a second threshold, combining the samples from the at least two consecutive discrete periods to generate a ZRO estimate,
wherein the method further comprises:
estimating a quality of a current ZRO value for the first inertial sensor;
determining a level of necessity of performing ZRO calibration based on the estimation of the quality of the current ZRO value for the first inertial sensor; and
controlling the motion of the device as a function of the level of necessity of performing ZRO calibration,
wherein the determining the level of necessity of performing ZRO calibration comprises generating a first flag indicative of the level, wherein the flag is in one of the following states:
a no-constraint state indicating that there is no current need to calibrate ZRO;
a stay-stationary state indicating that the overall stability status of the device indicates that the device should remain stationary;
a non-urgent-request-for-the-device-to-become-stationary state indicating that the device should become stationary if convenient to do so; and
an urgent-request-for-the device-to-become-stationary state indicating that the device should become stationary if possible,
wherein (1) the first flag is generated in the stay-stationary state when a ZRO calibration is being performed, (2) the first flag is generated in the non-urgent-request-to-become-stationary state when the current ZRO value is determined to be within a first accuracy range; (3) the first flag is generated in the urgent-request-to-become-stationary state the current ZRO value is determined to be within a second accuracy range; and (4) the first flag is generated in the no-constraint state when the current ZRO value is determined to be within a third accuracy range.

* * * * *